G. R. VAN AUKEN.
GREASE CUP.
APPLICATION FILED MAY 7, 1918.

1,285,478.

Patented Nov. 19, 1918.

Inventor
George R. Van Auken

By Lancaster & Allwine
his Attorneys.

UNITED STATES PATENT OFFICE.

GEORGE R. VAN AUKEN, OF MINNEAPOLIS, MINNESOTA.

GREASE-CUP.

1,285,478.  Specification of Letters Patent.  Patented Nov. 19, 1918.

Application filed May 7, 1918. Serial No. 233,043.

*To all whom it may concern:*

Be it known that I, GEORGE R. VAN AUKEN, a citizen of the United States, and a resident of Minneapolis, in the county of Hennepin and State of Minnesota, have invented certain new and useful Improvements in Grease-Cups, of which the following is a specification.

This invention relates to grease cups employed for containing and feeding hard lubricating oil to various working parts of machinery, and the primary object of the invention is to provide a grease cup of this nature which is comparatively simple in construction and one which is particularly designed to prevent the loss of the force plug of the grease cup during use.

The ordinary type of grease cup used for applying hard or soft lubricating oil to the bearing of locomotives, or analogous types of machinery where the vibration is relatively great, is constructed in such manner that the plug used to force the grease to the bearing becomes loosened and lost during the operation of the machinery and the object of this invention is to provide a grease cup eliminating the inconveniences contingent with the loss of the force plug.

Other objects of the invention will appear in the following detailed description, taken in connection with the accompanying drawing forming a part of this specification, and in which drawing.

Figure 1:
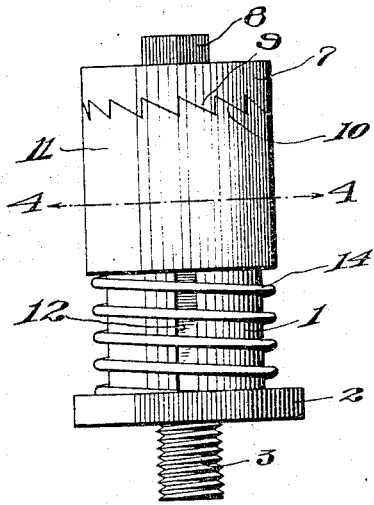
Figure 1 is a side elevation of the improved grease cup.
Figure 2:
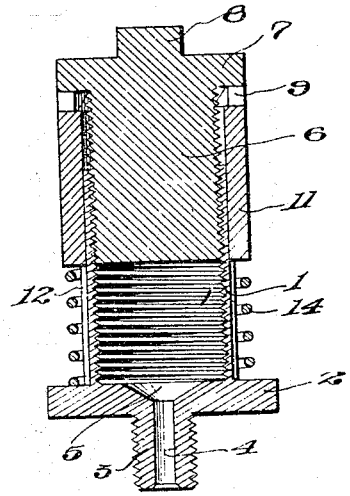
Fig. 2 is a vertical section through the grease cup.
Figure 3:
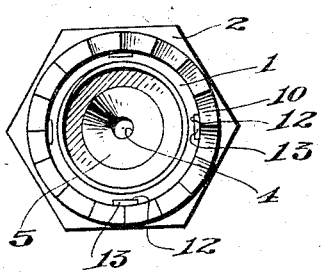
Fig. 3 is a plan of the grease cup having the force plug removed.
Figure 4:
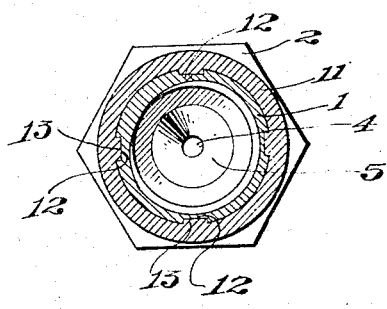
Fig. 4 is a section on the line 4—4 of Fig. 1.

Referring more particularly to the drawing, 1 designates the grease retaining body of the cup which is flared at its bottom or lower end as shown at 2 and has a reduced externally threaded stem 3 projecting outwardly from the center of the base for connection with the bearing of a machine and through which stem the lubricant feeding bore 4 extends. The base of the body 1 is provided with a substantially inverted conical shaped recess 5 communicating with the bore 4. The body 1 is internally screw-threaded and these internal threads are engaged by the external threads formed upon the shank 6 of the cap structure 7. The shank 6 forms a plug for forcing the lubricant out of the body through the bore 4. The cap 7 has a wrench head 8 formed centrally upon its upper surface and it also has a plurality of depending ratchet teeth 9 formed upon its under surface about its circumference, and exteriorly of the shank 6. The ratchet teeth 9 are provided for engagement with upstanding ratchet teeth 10 formed upon the upper end of a sleeve 11, to prevent the cap from backing off the body 1 and becoming lost.

The body 1 is provided with a plurality of vertical key-ways or recesses 12 formed at spaced distances about the circumference of the body in which key-ways keys or pins 13 formed within the sleeve 11 rise for preventing rotation of the sleeve independently of rotation of the body 1. A spiral expansion spring 14 is coiled about the body 1 and engages the lower edge or end of the sleeve 11 for holding this sleeve in an upward position and the ratchet teeth 10 in engagement with the ratchet teeth 8, respectively preventing reverse or upward moving rotation of the cap 7 independently of movement of the body and consequently preventing accidental disconnection between the cap and shank carried thereby and the body 1.

When it is desired to remove the cap 7 and plug 6 from connection with the body 1, for the purpose of filling the body with lubricant, the sleeve 11 is forced downwardly against the tension of the spring 14 and to move the ratchet teeth 10 out of engagement with the ratchet teeth 9, at which time the cap structure may be rotated independently of rotation of the body, either for disconnecting the cap and the body or for moving the shank 6 farther downwardly in the body to force lubricant outwardly through the bore 4.

Having fully described the invention what is claimed is:

1. In a grease cup, a retaining body, a cap for said body, a depending plug formed upon said cap and adjustably connected to said body for movement into the body to force lubricating grease therefrom, a sleeve upon said body, inter-engaging means carried by said sleeve and cap for preventing rotation of the cap and shank with respect to said body, and yieldable means engaging said sleeve to maintain said inter-engaging means in engagement.

2. In a lubricant cup, the combination, of an internally threaded retaining body, a cap for said body, a plug formed upon and depending from the under surface of said cap and being externally threaded for engagement with the internal threads of the body, a sleeve slidably mounted upon said body, means for preventing rotation of said sleeve with respect to said body, and interengaging means carried by said sleeve and cap for preventing rotation of said cap with respect to said body.

3. In a lubricant cup, an internally threaded retaining body, a cap for said body, a plug formed upon said cap and externally screw-threaded for engagement with the internal threads of said body, ratchet teeth formed upon and depending from the under surface of said cap, a sleeve slidably mounted upon said body, means for preventing rotation of said sleeve upon the body, and ratchet teeth formed upon the upper end of the sleeve for engagement with said cap carried ratchet teeth to prevent rotation of the cap with respect to the body.

4. In a lubricant cup, an internally threaded retaining body, a cap for said body, a plug formed upon said cap and externally screw-threaded for engagement with the internal threads of said body, ratchet teeth formed upon and depending from the under surface of said cap, a sleeve slidably mounted upon said body, means for preventing rotation of said sleeve upon the body, ratchet teeth formed upon the upper end of the sleeve for engagement with said cap carried ratchet teeth to prevent rotation of the cap with respect to the body, and an expansible spring engaging said body and the under surface of said sleeve for urging the sleeve upwardly on the body and holding the ratchet teeth thereon in engagement with the cap carried ratchet teeth.

5. In a lubricant cup, the combination, of an internally threaded retaining body, a cap for said body, a plug formed upon and depending from the under surface of said cap and adapted for adjustable insertion into the body, a sleeve slidably mounted upon said body, means for preventing rotation of said sleeve with respect to said body, interengaging means carried by said sleeve and cap for preventing rotation of the cap with respect to the body, and yieldable means engaging said sleeve to maintain said interengaging means in engagement.

6. In a lubricating cup, the combination, of a body, a cap therefor, a grease pressure member carried by said cap and connected to the body for adjusted movement therein, ratchet teeth upon said cap, ratchet teeth carried by said body for engagement with the cap carried teeth to hold said cap and pressure member against rotation with respect to the body.

GEORGE R. VAN AUKEN.

Copies of this patent may be obtained for five cents each, by addressing the "Commissioner of Patents, Washington, D. C."